(12) United States Patent
Ramaswamy et al.

(10) Patent No.: US 11,081,710 B2
(45) Date of Patent: Aug. 3, 2021

(54) POWER-ON SHUTDOWN OF FUEL CELL POWER PLANT FOR ENHANCED DURABILITY

(71) Applicant: Audi AG, Ingolstadt (DE)

(72) Inventors: Sitaram Ramaswamy, West Hartford, CT (US); Michael L. Perry, Glastonbury, CT (US)

(73) Assignee: AUDI AG, Ingolstadt (DE)

( * ) Notice: Subject to any disclaimer, the term of this patent is extended or adjusted under 35 U.S.C. 154(b) by 157 days.

(21) Appl. No.: 14/758,781

(22) PCT Filed: Jan. 11, 2013

(86) PCT No.: PCT/US2013/021240
§ 371 (c)(1),
(2) Date: Jun. 30, 2015

(87) PCT Pub. No.: WO2014/109761
PCT Pub. Date: Jul. 17, 2014

(65) Prior Publication Data
US 2015/0357663 A1 Dec. 10, 2015

(51) Int. Cl.
*H01M 8/04746* (2016.01)
*H01M 8/0438* (2016.01)
(Continued)

(52) U.S. Cl.
CPC ........... *H01M 8/04768* (2013.01); *B60L 1/00* (2013.01); *B60L 50/72* (2019.02); *B60L 53/30* (2019.02);
(Continued)

(58) Field of Classification Search
CPC ......... H01M 8/04303; H01M 8/04223–04268; H01M 8/043; H01M 8/04955
See application file for complete search history.

(56) References Cited

U.S. PATENT DOCUMENTS 6,195,999 B1 * 3/2001 Arnold ................. C01B 3/0005
60/649
7,790,303 B2 9/2010 Fredette
(Continued)

FOREIGN PATENT DOCUMENTS

EP 1 291 947 A1 3/2003
EP 1 860 718 A2 11/2007
(Continued)

*Primary Examiner* — Robert S Carrico
(74) *Attorney, Agent, or Firm* — Seed Intellectual Property Law Group LLP

(57) ABSTRACT

A technique is disclosed of modified shutdown of a fuel cell power plant (14) having a fuel eel! stack assembly (26) contained with and supplying electrical power to a mobile vehicle (12). The -vehicle characteristically proceeds at intervals to a station. (10) containing one or more resources (20, 20A, 20B, 20C, etc) utilized by the fuel cell power plant, for resupply thereof. One such, resource provided at/by the station is electrical energy (20A), aid operation of the fuel cell power plant (14) is controlled to utilize the availability of that electrical energy (20A) to maintain, an active protective Hydrogen On condition for greatly extended intervals, for example many hours to several days or longer, via a Power On mode of operation. The Power On mode maintains at least a low level of hydrogen introduction and circulation sufficient to maintain a predetermined presence, e.g., pressure, of hydrogen at the fuel cell stack assembly (26).

18 Claims, 5 Drawing Sheets

(51) Int. Cl.

| | | |
|---|---|---|
| *H01M 8/04303* | (2016.01) | |
| *H01M 8/241* | (2016.01) | |
| *H01M 8/04955* | (2016.01) | |
| *B60L 50/72* | (2019.01) | |
| *B60L 58/30* | (2019.01) | |
| *H01M 8/0444* | (2016.01) | |
| *H01M 8/04858* | (2016.01) | |
| *B60L 58/40* | (2019.01) | |
| *H01M 8/04089* | (2016.01) | |
| *B60L 53/50* | (2019.01) | |
| *B60L 1/00* | (2006.01) | |
| *B60L 53/30* | (2019.01) | |

(52) U.S. Cl.
CPC ............... *B60L 53/50* (2019.02); *B60L 58/30* (2019.02); *B60L 58/40* (2019.02); *H01M 8/0491* (2013.01); *H01M 8/04097* (2013.01); *H01M 8/04303* (2016.02); *H01M 8/04388* (2013.01); *H01M 8/04447* (2013.01); *H01M 8/04753* (2013.01); *H01M 8/04955* (2013.01); *H01M 8/241* (2013.01); *H01M 2250/20* (2013.01); *Y02T 10/7072* (2013.01); *Y02T 90/12* (2013.01); *Y02T 90/14* (2013.01); *Y02T 90/40* (2013.01)

(56) References Cited

U.S. PATENT DOCUMENTS

| | | |
|---|---|---|
| 8,142,950 B2 | 3/2012 | Reiser et al. |
| 2002/0182456 A1* | 12/2002 | Condit .............. H01M 8/04223 429/436 |
| 2003/0134167 A1* | 7/2003 | Hirakata ........... H01M 8/04228 429/432 |
| 2005/0031917 A1 | 2/2005 | Margiott et al. |
| 2007/0275272 A1* | 11/2007 | Muramatsu ......... H01M 8/0494 429/9 |
| 2009/0220832 A1* | 9/2009 | Reiser ............... H01M 8/04201 429/415 |
| 2011/0065012 A1 | 3/2011 | Kwon et al. |
| 2011/0200901 A1 | 8/2011 | Reiser |
| 2011/0223495 A1 | 9/2011 | Perry |
| 2012/0171585 A1 | 7/2012 | Mueller et al. |
| 2013/0004879 A1 | 1/2013 | Ohtani et al. |

FOREIGN PATENT DOCUMENTS

| | | |
|---|---|---|
| KR | 100805445 B1 | 2/2008 |
| KR | 100805448 B1 | 2/2008 |
| KR | 10-2009-0111241 A | 10/2009 |
| KR | 1020120059802 A | 6/2012 |
| WO | 2005/018017 A2 | 2/2005 |

\* cited by examiner

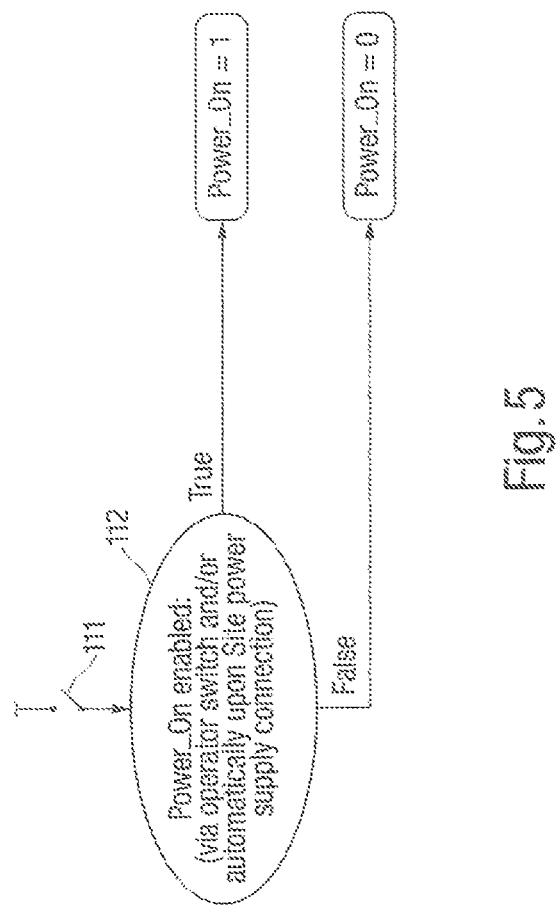

POWER-ON SHUTDOWN OF FUEL CELL POWER PLANT FOR ENHANCED DURABILITY

BACKGROUND

The disclosure relates generally to fuel cell power systems and more particularly to fuel cell power plants suited for mobile usage, as in transportation vehicles. More particularly still, the disclosure relates to operation of such feel cell power systems and the fuel cell power plan(s) thereof, into and/or in, mode(s) other then normal operating modes to enhance durability, economy, and/or the like.

Fuel cell power plants for mobile/transportation usage are increasingly being employed in automobiles and in larger carriers, such as bosses. Those power plains typically employ numerous PEM-type fuel cells arranged in one or more stack(s), or stack assembly(s) (CSA), for the generation of electrical power to both power electrical motors to directly propel the vehicle, and to provide energy for storage in au energy storage system such as a battery, or bank of batteries.

A PEM feel cell employs a membrane-type electrolyte in which the membrane is a proton exchange membrane, or polymer electrolyte membrane, (PEM). The membrane is disposed between anode and cathode electrodes respectively. The catalyzed cathode and anode serve to induce the desired electrochemical reactions. Reactants, typically art oxidant seen as oxygen or air and a fuel seen as hydrogen, are flowed through respective cathode and anode flow fields over respectively opposite sides of the membrane to obtain the requisite electrochemical reaction.

It is known that the startup and shutdown mechanisms associated with operation of a fuel cell stack have a critical, typically adverse, impact on the durability and life of the stack. Degradation of a fuel cell stack results from oxidation of catalyst support material, as well as high temperatures and high (electrical) potentials. This impact is more pronounced in the application of fuel cell power plants for transportation purposes, because of the increased number/frequency of startups and shutdowns as compared to typically long-duration operation in stationary applications, and is of particular impact with respect to such power plants in large transport vehicles, such as busses.

A number of different techniques have been proposed or employed to help mitigate the degradation mechanisms associated with the startup/shutdown cycle, with a preferred approach being one of hydrogen stabilization, sometimes referred to as a "Hydrogen On" (or "$H_2$ On") approach in the "Hydrogen On" approach, oxygen is removed from the air side volume of the fuel cell stack (including the oxidant flow fields in the cells, inlet and outlet manifolds, plumbing, etc), and hydrogen levels are stabilized in both the cathode and anode flow fields, thus preventing or minimizing at least high voltages in the cells. Typical hydrogen stabilization is accomplished in a shutdown procedure which includes (a) blocking the input of fresh air into the stack, (b) removing the service load and connecting the stack in a resistive auxiliary load, (e) performing cathode recycle by conducting cathode exhaust to the inlet of a/the cathode blower, which remains on, while continuing in provide fresh hydrogen to the cells, with fuel recycle on, and with fuel purge (exhaust) blocked, and continuing this until sufficient hydrogen has been provided to react with all of the residual oxygen in the air side volume, and (d) closing off the inlet of fresh hydrogen to the fuel cells while continuing to provide cathode and feel recycling (recirculation) until shutdown is completed. One representative example of such a system is disclosed in U.S. Pat. No. 8,142,950 issued Mar. 27, 2012 to Reiser et al, and assigned to the owner of the present application. Another similar representative example is disclosed in U. S. Patent Application Publication No. US 2011/0223495 A1 published Sep. 15, 2011 by M. L., Perry and assigned to the owner of the present invention.

It will be noted that the Hydrogen On stabilization approach is employed during the process of shutting down and may relatively quickly terminate the supply of air to the stack, but may continue to rely for a limited interval on the delivery and/or recirculation of hydrogen to the stack. While the passivation benefits of the Hydrogen On condition may conduce for some interval during the actual shutdown state, that interval is typically limited to a few hours, e.g., less than 16 hours. It has been deemed impractical from both logistical and durability standpoints to repeatedly restart, briefly operate, and again shutdown and $H_2$-passivate the fuel cell power plant for the purpose of extending the duration of the $H_2$ On passivation benefits. Such limits on the duration of the Hydrogen On condition correspondingly limit the benefits derived from such mode of operation, especially for extended intervals during which the power plant is normally shutdown.

SUMMARY

Various transportation vehicles do, or are required from time to time to, proceed to a station, garage, "shed", or terminal for various types of storage and/or maintenance. While at such stations, the vehicle may receive a recharge of various resources such as hydrogen fuel, and its feel cell power plant has heretofore typically been in a shutdown condition for intervals that may extend from several hours to several days. However, it is recognized herein that by utilizing one or more of the station's relatively unlimited resources, including at least electrical power, and by modifying the normal shutdown process to include a so-called Power On mode, it is possible for the protective Hydrogen On condition to remain active for greatly extended intervals.

A method or technique is disclosed of modified shutdown of, or for, a fuel cell power plant contained with and supplying electrical power to a mobile vehicle. The vehicle characteristically proceeds at intervals to a station containing one or more resources utilized by the fuel cell power plant, for resupply thereof. One such resource provided at/by the station is electrical energy, and operation of the fuel cell power plant is modified to utilize the availability of that electrical energy to maintain an active protective Hydrogen On condition for greatly extended intervals, for example of several days or longer, via a so-called Powder On mode of operation.

The Power On mode maintains a passivating flow of hydrogen, directly and/or by recirculation, to or within the fuel cell power plant, and is typically entered via modification of an otherwise conventional shutdown procedure. Whereas initial aspects of a conventional shutdown procedure are or may be, retained, at some preselected phase or condition in that procedure at which most of the $H_2$ passivation will have been attained, the procedure may be modified in response to the presence of at least external electrical power. The procedure is modified to maintain a hydrogen flow, directly and/or by recirculation, to thereby maintain and extend the duration of hydrogen passivation to intervals greater than 16 hours, or 30 hours, or indeed to many days. Regulation of hydrogen flow may be in response to a sensed pressure of hydrogen, be example at or near an inlet for the hydrogen to the fuel cell of the fuel cell power plant, and involve providing hydrogen when the sensed pressure thereof decreases to soma threshold, for example 2 kPa.

While the provision of the Power On mode of operation, depends initially upon the availability of electrical power at the station to extend the otherwise limited duration of $H_2$ On passivation, additional benefits may also be derived during the Power On mode by supplying to the vehicle and/or the feel cell power plant other resources from the station, such as supplemental $H_2$ and/or supplemental coolant and/or cooling capacity.

The foregoing features and advantages of the present disclosure will become more apparent in light of the following detailed description of exemplary embodiments thereof as illustrated in the accompanying drawings.

BRIEF DESCRIPTION OF THE DRAWINGS

Many aspects of the disclosure can be better understood with reference to the following drawings. The components in the drawings am not necessarily to scale. Moreover, in the drawings, like reference numerals designate corresponding parts throughout the several views.

FIG. 5 is a simple functional pictorial representation of the determination of a Power On enabled stare.

DETAILED DESCRIPTION

Figure 1:
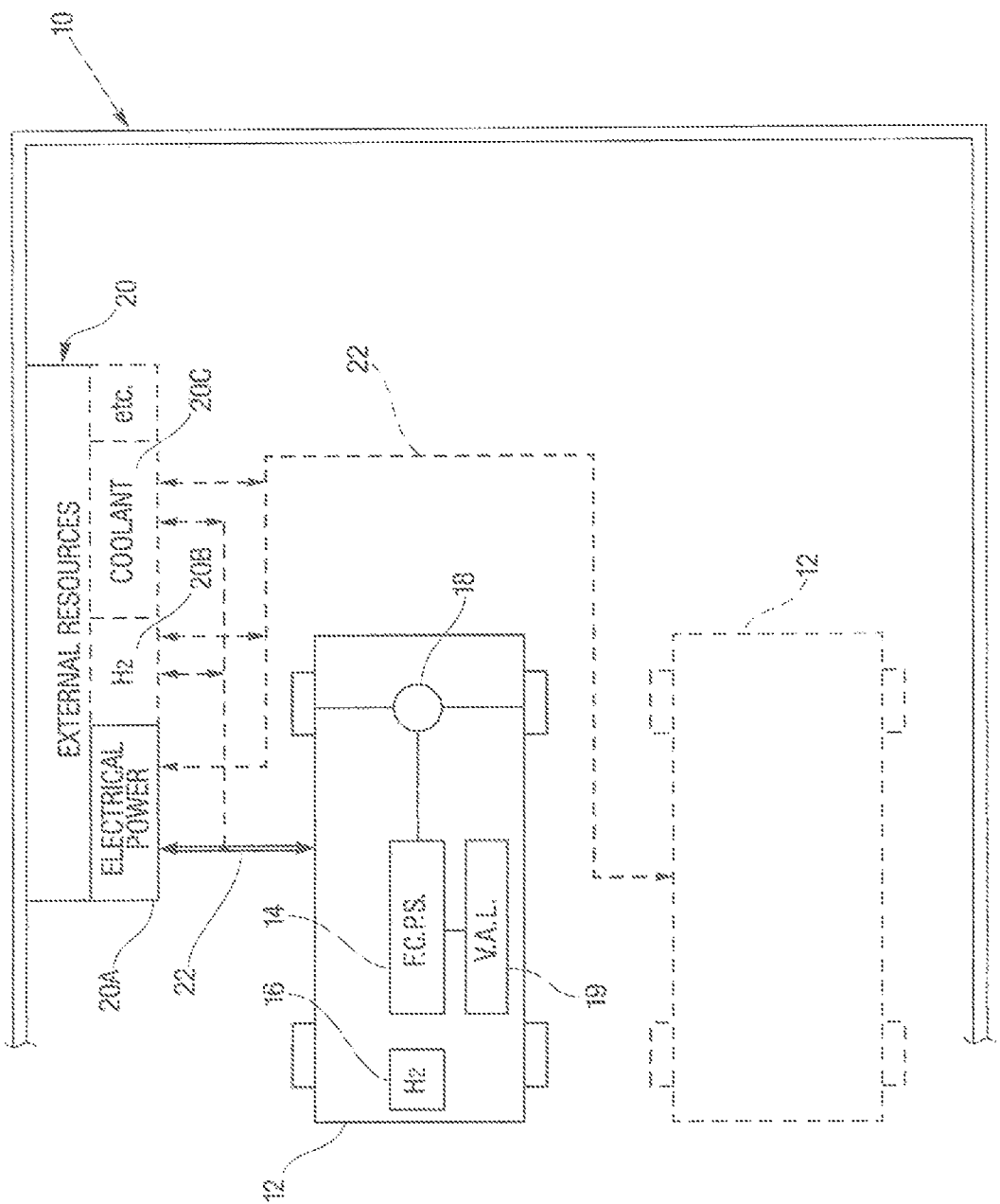
FIG. 1 is a simplified diagram illustrating a part of a station or terminal at which one or more vehicles having a met ceil power plant are, or may be, connected to external resources in accordance with the present disclosure.

Many aspects of the disclosure can be better understood with reference to the following drawings. The components in the drawings are not necessarily to scale. Moreover, in the drawings, like reference numerals designate corresponding parts throughout the several views.

Referring to FIG. 1, there is depicted a portion of a station 10, referred to variously also as a terminal, shed, garage, etc., at which, one or more fuel cell-powered vehicles 12 may be temporarily located, as for periodic storage, maintenance, and/or replenishment of required resources. The vehicles 12 characteristically contain a fuel cell power system (FCPS) 14, a limited on-board supply of hydrogen 16, an electric rumor drive 18, and various vehicle auxiliary loads 19. While the vehicle 12 might be any of various types of fuel cell-powered vehicles, including but not limited to automobiles, pucks, and busses, the disclosure is particularly directed to vehicles such as busses which routinely proceed to a station 10 for overnight weekend, or longer, storage or housing, and which may obtain replenishment at the terminal 10 of one or more "external" resources 20. Those resources 20 include at least electrical power 20A, and may optionally also include hydrogen 20B, coolant and coolant processing 20C, and/or other resources. Such resources 20 are, or may be, conveniently available at a station 10, and in quantities that are normally unlimited relative to their limited quantities as housed on the respective vehicles 12. For illustrative purposes in FIG. 1, each and all of the resources 20 are depicted as being connected to a respective vehicle 12 via a gross conduit 22, which in actuality will be various independent conduits for the materials, entities, properties, and functions conveyed. It will be understood, though not separately shown, that for the transfer of electrical power there will be appropriate electrical cables/connectors/contactors, etc. The same would be true for the optional provision of hydrogen and/or coolant and coolant processing. Importantly also, the gross conduit 22 is presumed to embrace the transfer of signal information between the vehicle 12 and the station 10 with respect to the resources 20.

Figure 2:
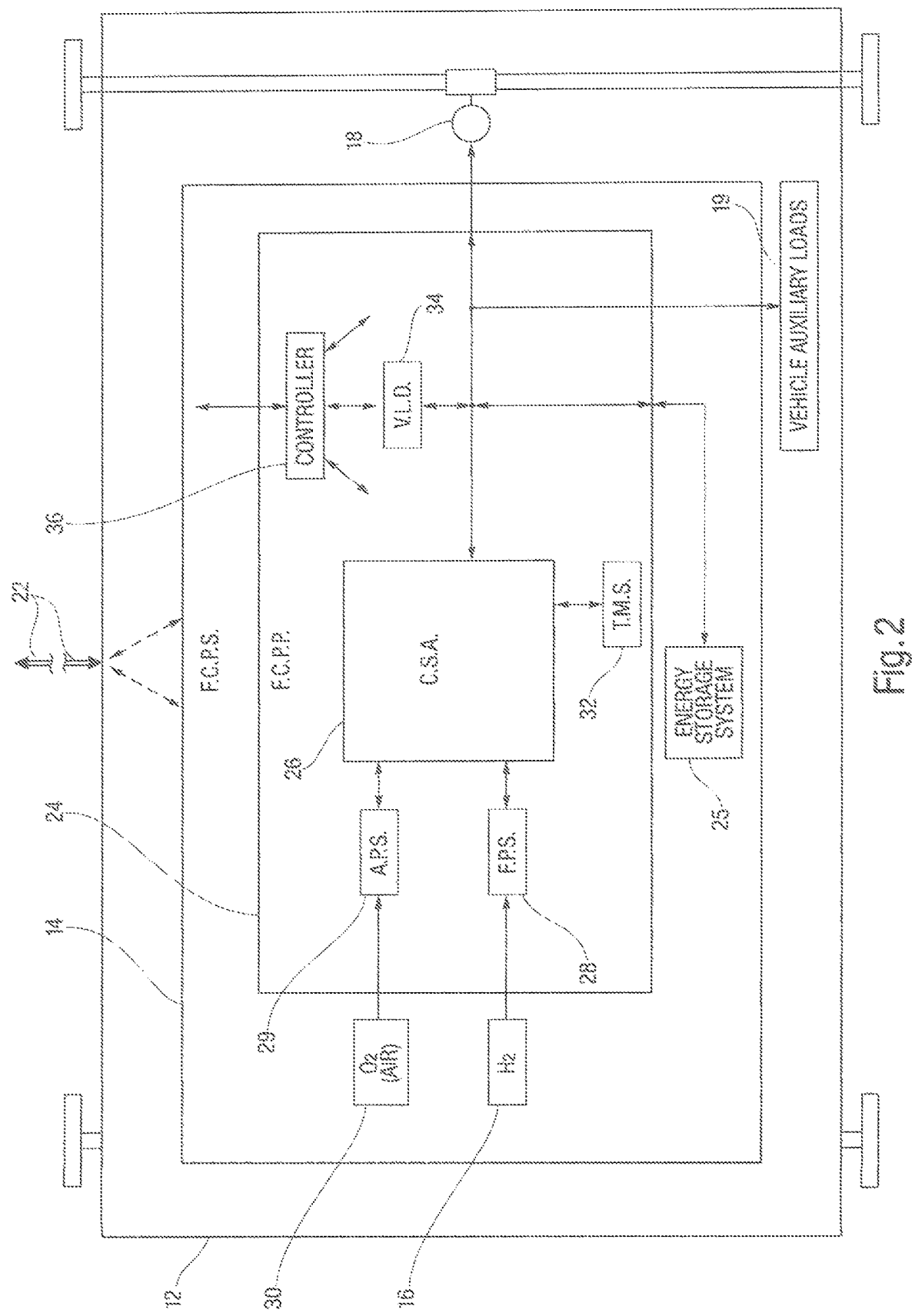
FIG. 2 is a generalized diagram of a vehicle of FIG. 1, depleting in block form various generalized components of the fuel cell power plant.

Referring to FIG. 2, the vehicle 12, and particularly the fuel cell power system 14, is depicted in somewhat greater detail. The FCPS 14 importantly includes a fuel cell power plant (FCPP) 24. It may also include an electrical energy storage system (PSS) 25. The FCPP 24 is capable of electrochemically providing electrical energy in a known manner. The ESS 25 may be a rechargeable battery, or battery system. Either, or both, of the FCPP 24 and the ESS 25 is/are capable of providing electrical energy to the vehicle motor drive to propel the vehicle 12. The ESS 25 may conveniently be recharged, to varying extents, by dynamic braking of die vehicle and/or by operation of the FCPP 24. Moreover, the ESS 25 is depicted in FIG. 2 as being connected to also supply electrical energy to the FCPP 24. This capacity allows some limited, operation of limited duration of various electrically-powered equipment that comprise part of the FCPP 24, even during times such as shutdown when the FCPP 24 is not normally supplying electrical energy, and for purposes of restart.

Considering the FCPP 24 in greater detail, it is generally comprised of a fuel cell stack assembly (CSA) 26; a fuel processing system (FPS) 28 for processing the hydrogen fuel delivered from on-board source 16 and delivered to and/or recirculated from/to the CSA 26; an air processing, system (APS) 29 for receiving an oxidant such as air from a source designated 30 and delivered to and/or recirculated from/to the CSA 26; a thermal management system (TMS) 32 for managing the thermal requirements of the CSA 26; a voltage limiting device (VLD) 34 for regulating and/or limiting the output voltage of the CSA 26; and a controller 36 for regulating the numerous processes and functions of at least the FCPP 24, and typically also those of the ESS 25, the vehicle auxiliary loads 19, and, the interface between the station resources and the vehicle 12, particularly the FCPP 24.

Figure 3:
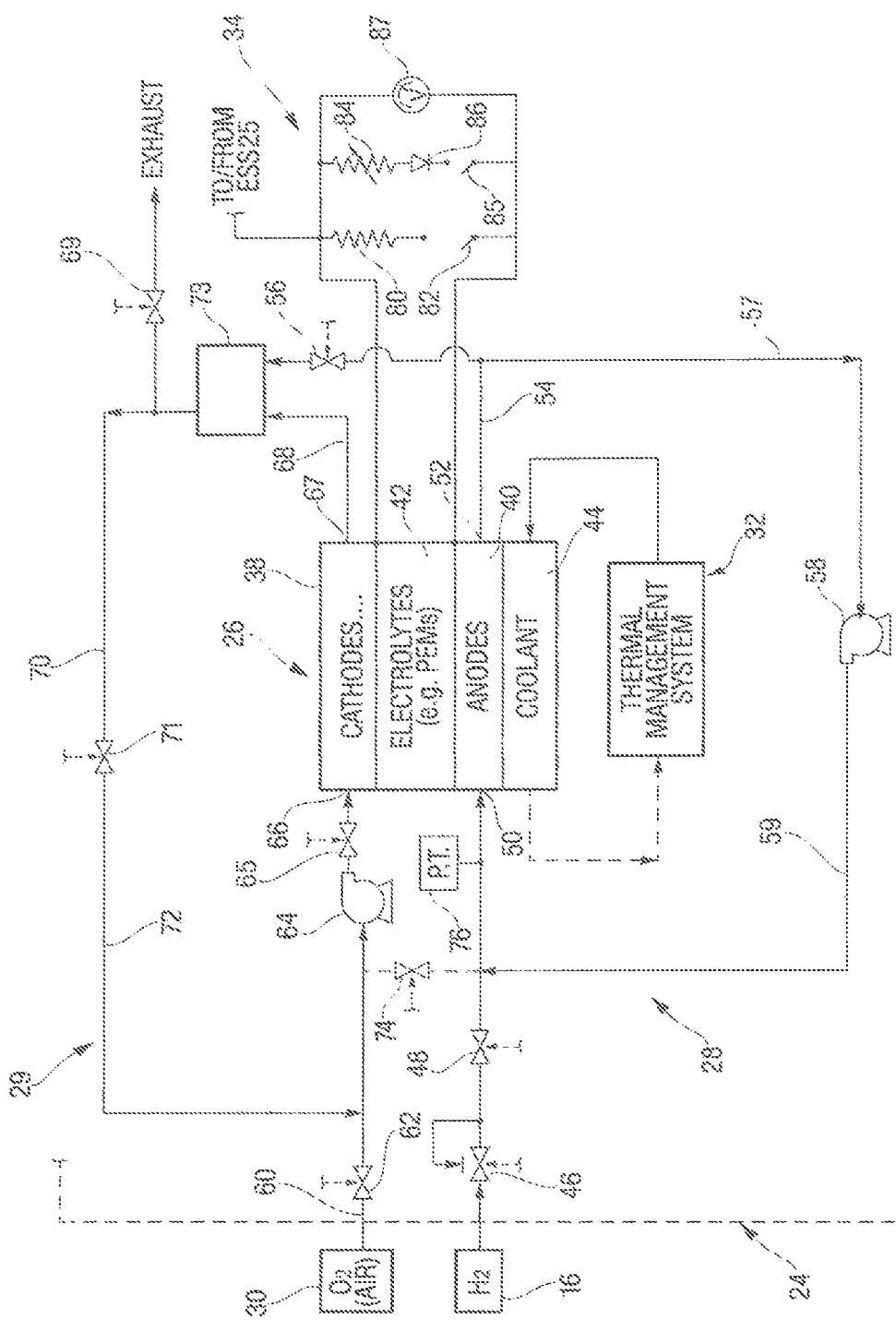
FIG. 3 is a schematic diagram view of relevant portions of the fuel cell power plant of FIG. 2, illustrating some of the components and their interconnections in greater detail.

Reference is now made to FIG. 3 which depicts the relevant components of the FCPP 24 in greater detail. The fuel cell stack assembly 26 is comprised of multiple fuel cells, here collectively shown as a single cell, each having a cathode 38 and an anode 40 with an electrolyte 42 between them. In the illustrated embodiment, the electrolyte is a proton exchange membrane (PEM). In an exemplary embodiment, the reactant gas flow fields (well known and not shown) are disposed in bipolar plates, at least one of which has coolant passages 44 on a side of the plate opposite to the side having reactant gas flow field channels. These bipolar plates can either be solid or micro-porous, hydrophilic water transport plates, both of which are well known. There may or may not be cooler plates Interspersed or at intervals between bipolar plates.

Fuel is provided, from the onboard source 16 of hydrogen, through a pressure control valve 46, and a fuel flow control valve 48 to inlets 50 of the anodes. The exits 52 of the flow fields transfer hydrogen-depleted exhaust through a conduit 54 that leads to a remotely controllable anode exhaust valve 56, which in turn is operatively connected to a mixing box 73. The anode exhaust valve 56 may be slightly opened continuously, or operated periodically on a poise-width modulation basis, as necessary to eliminate contaminants and hunts such as nitrogen, and/or for mixture with exhaust air for possible recycle. A conduit 57 also connected to conduit 54 connects the anode exhaust to an anode recycle pump 58, which might be an ejector, the output of which in a conduit 59 is connected with the inlets 50 of the anodes for anode fuel recycle. The anode recycle pump may also be an electrochemical hydrogen pump which relies upon passing a direct current through the feel cell in a known manner and provides both recirculation and purification of the exit hydrogen.

Air is provided in a conduit 60 through an air inlet valve 62 to an air blower 64, which provides air through an air control valve 65 to inlets 66 of the cathodes 38. The cathode exits 67 are connected through a conduit 68 and an exhaust valve 69 to exhaust and includes a mixing box 73 where exhausted process air is mixed with exhausted feel so as to reduce flammability before discharging to the atmosphere, as well as for possible recycle to the cathodes 38. The exhaust valve 69 is remotely operable for variably controlling the exhaust flow of not only the cathodes 38 but also the anodes 40, including partially and fully closed, states for facilitating cathode recycle flow.

To perform hydrogen stabilization in the anodes and cathodes at shutdown, cathode recycle is provided in this embodiment by a conduit 70 which is connected through a remotely operable feedback valve 71 and a conduit 72 to the inlet of air blower 64. Still further, a hydrogen transfer means in communication between the flow path of anodes 40 and the flow paths of cathodes 38 selectively permits transfer of hydrogen feel between those flow fields during shutdown. In this embodiment, the hydrogen transfer means comprises the hydrogen-containing exhaust from the anodes 40 being connected to the mixing box 73 via conduit 54 and anode exhaust valve 56, for mixing with air exhausted from the cathodes 38 and then recycled via conduits 70 and 72. Alternatively, or additionally, other hydrogen transfer means may comprise a hydrogen transfer valve 74, here depicted in broken line form, secured in fluid communication between the anode inlets 50 and a lower-pressure point in the cathode recycle path, such as at the inlet to the air blower 64 leading to the cathode inlets 66. Other alternate means for such hydrogen, transfer might take the form of an electrochemical hydrogen pump which relies upon passing a direct current through the fuel cell in a known manner, or simply by relying upon relatively slow diffusion of hydrogen across the PEM electrolyte 42.

The thermal management system 32 is depicted only in a generalized form, but it will be understood that it may take any of several well known forms for condensing or otherwise cooling moisture or liquid coolant exiting the cell stack assembly 26 and selectively returning some portion to the coolant passages 44. If the cell stack assembly 26 is cooled by conduction and convection of sensible heat into circulating coolant, the thermal management system will typically include a fan-cooled heat exchanger and liquid circulating pump, as well as an accumulator. If the cell stack assembly 26 employs evaporative cooling, the cathode exhaust may be condensed by a condenser and the resulting liquid stored in an accumulator for selective use in the stack.

A pressure transducer 76 is operably connected with the hydrogen flow path for sensing and indicating the pressure of hydrogen therein as a facet of the Power On routine or procedure to be hereinafter described in greater detail. The hydrogen pressure transducer 76 is conveniently connected to the hydrogen inlet stream substantially at or near the anode inlets 50, and has a pressure measuring range sufficient to embrace the pressures hereinafter described.

Referring briefly to the portion of FIGS. 2 and 3 designated VLD 34, there is depicted in FIG. 3 an external circuit 78 that receives electrical current generated by the CSA 26 for supply to a primary load designated 80 when a primary switch 82 is closed (shown open here) and the CSA is in normal operation. That primary load designated 80 will typically include at least the vehicle motor drive 18, and may additionally include all or some of the vehicle auxiliary loads 19, but would not normally, though may, include the various loads required to operate the FCPP itself. The VLD 34 additionally includes an auxiliary load 84, here depicted as being of a variable or remotely adjustable resistance, that does not receive electrical current during normal operation of the CSA 26 and an auxiliary load switch 85 is open. The auxiliary load 84 is intended to reduce and/or limit CSA 26 output voltage during the shutdown procedure, as known and later described. A diode 86 may be connected in series with the auxiliary load 84 to terminate current flow through the latter when cell output voltage drops below a pre-selected value. A voltmeter 87 or similar voltage sensing device is connected across the electrical output terminals of the CSA 26 to provide an indication of voltage for purposes of control and regulation. The voltage limiting function may alternatively or additionally be provided by the ESS 25, for example as disclosed I U.S. Pat. No. 7,790,303 by S. J. Fredette and assigned to the owner of the present invention.

Although no separate connections are depicted, the controller 36 of the FCPP 24 is understood to be operatively connected with the various elements under its control and forming part of the following description of operation. The controller 36 may take any of a variety of well known forms capable of performing the functions hereinafter described, with examples ranging from simple manual operation of some or all valves and connections, etc, to programmed electronic digital processor control via hardwired and/or remote wireless connection. The ability to sense actual connectivity with one or more of the resources 20, though not shown, is presumed as known and understood, and may include sensors associated with physical contact, detection of electrical current, hydrogen, and/or coolant flow, etc.

Figure 4B:
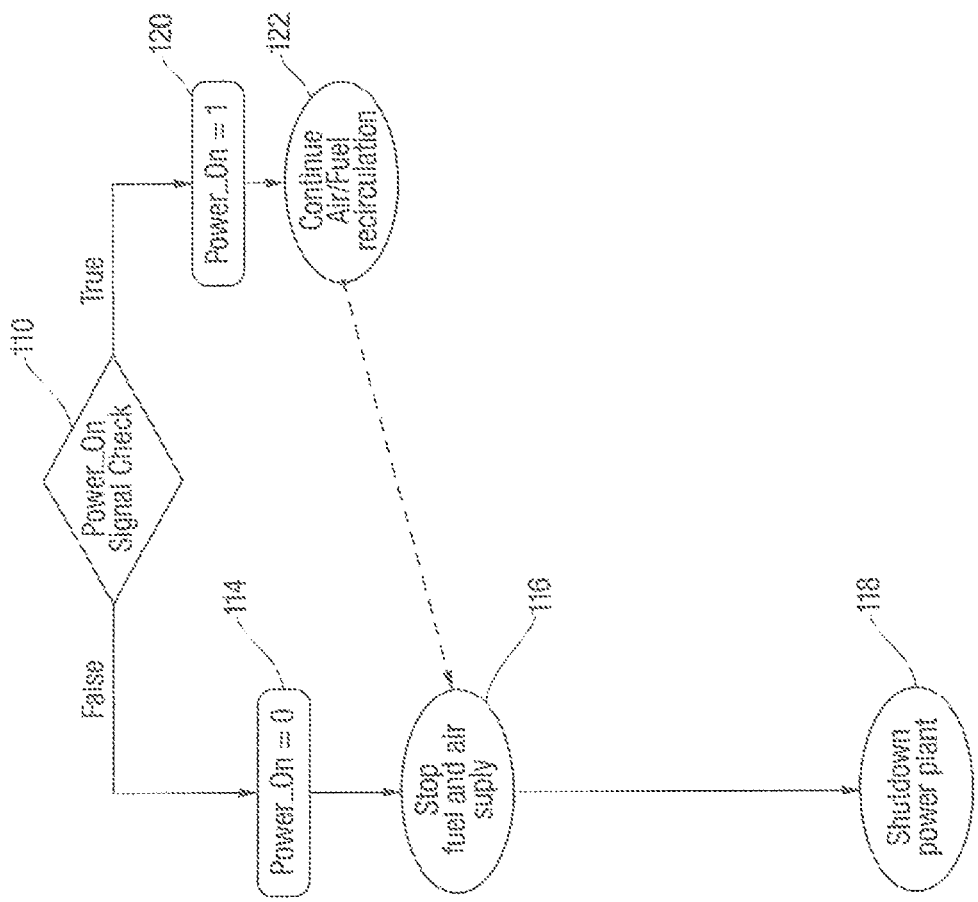
FIG. 4B is a continuation of the generalized functional flow diagram began in FIG. 4A, illustrating, alternatively, completion of the shutdown process or entry into and maintenance of the Power On process.
Figure 4A:
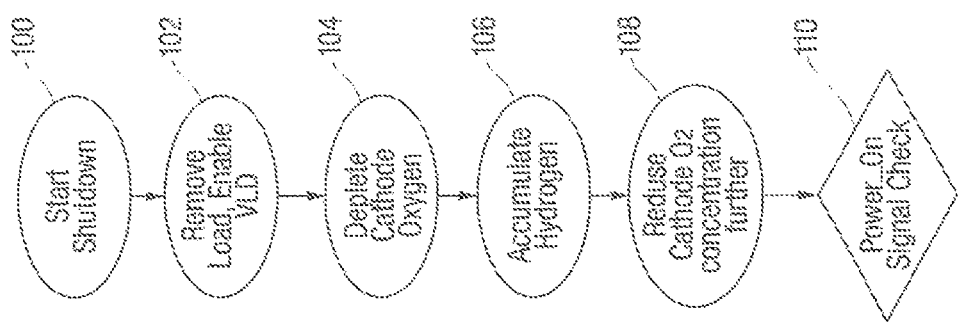
FIG. 4A illustrates a generalized functional flow diagram of the initial portion of the Hydrogen On shutdown process prior to determination of a bower On enabled state.

Attention is now directed additionally to FIGS. 4A, 4B, and 5 for an understanding of the process of operation in a Power On mode, including the initial process of shutting down and diverting from that process, prior to reaching the full shutdown state, to a branch process of Power On which maintains an active Hydrogen On condition for an extended interval. These Figs. functionally depict the higher level operations of that process, and the accompanying description correlates the hardware of FIGS. 1-3 with the flow diagram(s) of FIGS. 4A, 4B, and 5.

During normal operation of the FCPP 24, primary switch 82 is closed and electricity is being provided to at least the primary load 80, which may include vehicle drive motor 18. The oxidant blower 30 and the anode recycle pump 58 are on. The air inlet valve 62 and the cathode exhaust valve 69 are open, as are the hydrogen inlet valve 48 and anode exhaust valve 56. Generally, air is flowing through the cathode fields and being exhausted, and hydrogen is flowing through the anode fields, with some being exhausted via anode exhaust valve 56, mixing box 73, and cathode exhaust valve 69, and some being recycled (recirculated) to the anode fields.

Shutting down the FCPP 24 will typically occur when the vehicle 12 is at rest, and in the present instance may be located at station 10. Whether the FCPP 24 folly shuts down or alternately enters the Power On mode is determined by whether or not the vehicle 12 is operatively connected to one or more of the resources 20 at station 10.

Step 100 in FIG. 4A represents the initiation of the shutdown process, and is accomplished by a switch or ignition signal "off" or other method (not shown). This in tarn is followed at step 102 by the removal of the primary load 80 and the enabling of the voltage limiting device 34. More specifically, step 102 involves opening switch 82, and closing switch 85 that connects auxiliary load 84, which in torn may be a variable load device.

Next, the cathode oxygen is depleted at step 104 by closing the air inlet valve 62 and the cathode exhaust valve 69; running the air blower 64 at maximum, speed for some preselected interval, for example in the range of 3 to 300 seconds; monitoring the voltage output of the CSA 26, as via voltmeter 87; and when the voltage drops sufficiently, as for example to a preselected level between about 0.1 and 0.7 volts, proceeding to step 106.

At step 106, hydrogen is accumulated in the CSA 26 by reducing the speed of the air blower 64 to somewhere in the range of 20%-70% of its maximum speed; and maintaining the air inlet valve 62 and the cathode exhaust valve 69 in the closed state. During this phase, hydrogen will migrate and/or be transported from the anodes 40 to the cathodes 38 where it reacts with the oxygen, thus serving to further deplete the oxygen. The direct transport of hydrogen comes, in the illustrated, embodiment, at least partly front the recycle to the cathodes 38 of anode exhaust hydrogen mixed with cathode exhaust air at mixing box 73, which assumes the anode exhaust valve 56 to remain at least partly open.

As an adjunct or extension of the process describe for step 106, the next step 108 acts to reduce cathode oxygen concentration oven further by perhaps reducing the speed of air blower even lower in the range presented with respect to step 106; maintaining the air inlet valve 62 and the cathode exhaust valve 69 in the closed state; and changing/varying the resistance of the auxiliary load 84 of the VLD 34 to a lower value to increase current draw. As in step 106, hydrogen will continue to migrate and/or be transported from the anodes 40 to the cathodes 38 where it reacts with the oxygen, thus serving to further deplete the oxygen. Then, shortly after entering step 108 of the shutdown procedure (e.g., 0.1s to 1.0s), the program sequence queries whether or not it is to enter the Power On mode. This is done at decision step 110 by conducting a Power_On signal cheek.

Referring briefly to FIG. 5, there is depicted a functional representation of a symbolic Power On switch 111, here shown closed, for setting in step 112*a* Power On Sag either to a "1" (True) state or to a "0" (False) state. The True state is reflective that the Power On mode is, or is to be, enabled, and may be attained symbolically by closure of switch 111 manually by an operator and/or automatically upon actual operative connection of the FCPP 24 to at least the electrical power 20A at the station 10. To the extent others of the external resources 20, such as hydrogen 20B and/or coolant resources 20C are to be utilized in addition to the electrical power, appropriate signals indicating their respective connections may also be used or required to establish the Power On enabled, or True, state.

Returning to the flow diagram, now at FIG. 4B, it will be noted that the Power On signal cheek of decision step 110 presents either a True or a False response alternative, depending upon which flag was set in step 112 of FIG. 5. If the Power On mode flag had been set to a "0", indicating False, at block 114, typically because the vehicle 12 and its FCPP 24 are not actually connected to the electrical power resource 20A, then the shutdown routine is continued at step 116 by stopping the fuel and air supplies. This is done by shutdown of the air blower 64; and closing, or maintaining closed, the hydrogen inlet valve 48, the air inlet valve 62, the air recirculation valve 71, and the cathode exhaust valve 69. Following completion of these steps the fuel cell power plant 24, and particularly the CSA 24, will be deemed, shutdown, as reflected at function block 118.

If, however, the Power On mode flag had been set to a "1" indicating True, at block 120, typically because the vehicle 12 and its FCPP 24 are actually connected to the electrical power resource 20A, then the Power On mode is entered as reflected in function step 122 at which the recirculation of air and hydrogen fuel is continued. Viewing the Power On mode in greater detail, the electrical power is now supplied to the FCPP 24 from the main power bus resource 20A of the station 10 to assure adequate power for the various primps, blowers, valve actuators, etc. for an expended, potentially indefinite, period that may comprise many hours, e.g., 16 or 30, or days, or even weeks, being limited only by limits on the availability of other resources such as hydrogen. In this Power On mode, the air blower speed is reduced from the prior maximum, typically to less than 30% of that maximum speed, while continuing to recirculate cathode exhaust mixed with anode exhaust as the anode exhaust valve 56 continues to remain partly open. The pressure sensor 46 monitors the anode inlet 50 pressure and, via operation, of the controller 36, serves to activate the hydrogen inlet valve 48 in a manner that maintains the pressure above some minimum threshold, as for example 2 kPa, but below about 10 kPa as determined by the characteristics of the stack and cell materials including crossover sensitivity and sealing properties. Similarly, the recirculation of the hydrogen exhaust from the anodes 40 back to the anode inlets 50 is continued via recycle pump or ejector 58.

As noted, the Power On mode may fee continued for a lengthy period, however for a variety of reasons it may become desirable or necessary to terminate it. One prime example is the need to restart the FCPP 24 for normal operation, another example being a cessation of the availability or connection with, the supplied external resource. Accordingly, the program routine which defines and controls the Power On mode includes provision far periodically returning to the Power On decision block 110 to cheek that the Power On state should, or does, remain enabled, if at any time the check of the Power On state reveals the False, or "0", condition, the program routine of function block 122 immediately jumps, shown by broken line 125, to the shutdown routine depicted and described with respect to step 116 to complete a shutdown operation.

Although the disclosure has been described and illustrated with respect to the exemplary embodiments thereof it should be understood by those skilled in the art that the foregoing and various other changes, omissions and additions may be made without departing from the spirit and scope of the disclosure.

What is claimed is:

1. A method, including:
   performing a shutdown operation for a fuel cell power plant in a mobile vehicle, the shutdown procedure including a hydrogen passivation process, the performing the shutdown operation including:
   connecting the mobile vehicle to an electrical energy resource and an external hydrogen resource; and
   automatically activating the hydrogen passivation process prior to reaching a full shutdown state of the fuel cell power plant, the activating occurring in response to a sensing of a connection of the electrical energy resource and the external hydrogen resource to the mobile vehicle, the hydrogen passivation process including maintaining introduction of hydrogen into the fuel cell power plant through a hydrogen inlet valve for greater than 16 hours and maintaining a flow of the hydrogen through an anode exhaust valve to a cathode recirculation conduit for greater than 16 hours.

2. The method of claim 1, wherein the fuel cell power plant includes electrically-powered equipment and the hydrogen passivation further includes operating at least some of the electrically-powered equipment.

3. The method of claim 2, wherein the maintaining a flow of hydrogen is for is greater than 30 hours.

4. The method of claim 1, wherein the mobile vehicle includes an on-board source of hydrogen and the method further includes re-supplying the on-board source of hydrogen.

5. The method of claim 1, wherein the fuel cell power plant includes a coolant circulation system, and the method further includes connecting the mobile vehicle to a coolant resource and circulating coolant from the coolant resource in the coolant circulation system during the hydrogen passivation procedure.

6. The method of claim 1, wherein the method further includes sensing a first hydrogen pressure at a location in the fuel cell power plant and increasing the first hydrogen pressure to a second hydrogen pressure when the first hydrogen pressure is below a threshold.

7. The method of claim 6, wherein the fuel cell power plant includes a cell stack assembly having an anode inlet, and the sensing is at the anode inlet.

8. The method of claim 7, wherein the method includes regulating the hydrogen inlet valve to control a flow of hydrogen between an on-board hydrogen source and the anode inlet.

9. The method of claim 6, wherein the threshold is 2 kPa.

10. The method of claim 6, wherein the increasing includes controlling the first hydrogen pressure using the valve.

11. The method of claim 1, wherein the mobile vehicle includes an on-board electrical energy storage system of limited capacity for supplying electrical energy to the vehicle.

12. The method of claim 1, wherein the fuel cell power plant includes a cell stack assembly and a voltage limiting device.

13. A device including:
   a fuel cell power plant that includes:
      a cell stack assembly; and
      a controller configured to:
         control a shutdown operation of the fuel cell power plant;
         automatically activate and control a hydrogen passivation process of the shutdown operation in response to coupling the fuel cell power plant to an electrical energy source and to an external hydrogen resource, the hydrogen passivation process including maintaining introduction of hydrogen into the fuel cell power plant through a hydrogen inlet valve for greater than 16 hours and maintaining a flow of the hydrogen through an anode exhaust valve to a cathode recirculation conduit for greater than 16 hours.

14. The device of claim 13, wherein the fuel cell power plant further includes a voltage limiting device coupled to the controller.

15. The device of claim 13, wherein the fuel cell power plant further includes an air processing system coupled to the cell stack assembly.

16. A system, including:
   a mobile vehicle that includes:
      a fuel cell power plant that includes:
         a cell stack assembly; and
         a controller configured to:
            control a shutdown operation of the fuel cell power plant;
            automatically activate and control a hydrogen passivation process of the shutdown operation in response to coupling the fuel cell power plant to an electrical energy source and to an external hydrogen resource, the hydrogen passivation process including maintaining introduction of hydrogen into the fuel cell power plant through a hydrogen inlet valve for greater than 16 hours and maintaining a flow of hydrogen through an anode exhaust valve to a cathode recirculation conduit for greater than 16 hours.

17. The system of claim 16, wherein the fuel cell power plant further includes a thermal management system coupled to the cell stack assembly.

18. The system of claim 16, wherein the fuel cell power plant further includes a fuel processing system coupled to the cell stack assembly.

* * * * *

UNITED STATES PATENT AND TRADEMARK OFFICE
CERTIFICATE OF CORRECTION

PATENT NO. : 11,081,710 B2  
APPLICATION NO. : 14/758781  
DATED : August 3, 2021  
INVENTOR(S) : Sitaram Ramaswamy et al.

It is certified that error appears in the above-identified patent and that said Letters Patent is hereby corrected as shown below:

On the Title Page

Item (57) Abstract, Line 2:
"fuel eel! stack" should read: --fuel cell stack--.

Item (57) Abstract, Line 4:
"The -vehicle" should read: --The vehicle--.

In the Claims

Column 9, Claim 3, Line 25:
"hydrogen is for is greater than 30 hours" should read: --hydrogen is for greater than 30 hours--.

Signed and Sealed this  
First Day of November, 2022

Katherine Kelly Vidal  
*Director of the United States Patent and Trademark Office*